(12) United States Patent
Tsujii et al.

(10) Patent No.: US 8,739,614 B2
(45) Date of Patent: Jun. 3, 2014

(54) DETERIORATION DETERMINATION APPARATUS FOR AIRFLOW METER AND DETERIORATION DETERMINATION METHOD

(75) Inventors: Hidehito Tsujii, Obu (JP); Kiyohisa Inoue, Chiryu (JP)

(73) Assignee: Denso Corporation, Kariya (JP)

( * ) Notice: Subject to any disclaimer, the term of this patent is extended or adjusted under 35 U.S.C. 154(b) by 203 days.

(21) Appl. No.: 13/277,476

(22) Filed: Oct. 20, 2011

(65) Prior Publication Data

US 2012/0111100 A1    May 10, 2012

(30) Foreign Application Priority Data

Oct. 20, 2010  (JP) ................................. 2010-235950

(51) Int. Cl.
*G01M 15/04* (2006.01)
(52) U.S. Cl.
USPC ...................................................... 73/114.32
(58) Field of Classification Search
USPC ............... 73/114.31, 114.32, 114.33, 114.36, 73/114.77
See application file for complete search history.

(56) References Cited

U.S. PATENT DOCUMENTS

| | | | |
|---|---|---|---|
| 5,014,548 A | | 5/1991 | Tomisawa |
| 5,235,527 A | | 8/1993 | Ogawa et al. |
| 5,698,780 A | * | 12/1997 | Mizutani et al. ............ 73/114.33 |
| 5,741,964 A | * | 4/1998 | Mizutani ..................... 73/114.32 |
| 2004/0079341 A1 | * | 4/2004 | Fuwa .............................. 123/488 |
| 2007/0240680 A1 | * | 10/2007 | Muto et al. ..................... 123/396 |
| 2008/0196487 A1 | * | 8/2008 | Suzuki ........................ 73/114.34 |
| 2008/0270011 A1 | * | 10/2008 | Takahashi et al. ............. 701/114 |
| 2011/0023852 A1 | * | 2/2011 | Yamashita ..................... 123/574 |
| 2012/0079889 A1 | * | 4/2012 | Kohno ............................ 73/861 |

FOREIGN PATENT DOCUMENTS

| | | |
|---|---|---|
| EP | 1 229 238 | 8/2002 |
| JP | S63-233326 | 9/1988 |
| JP | 4-174325 | 6/1992 |
| JP | 4-298670 | 10/1992 |
| JP | 6-346778 | 12/1994 |
| JP | 2000-97101 | 4/2000 |
| JP | 3075877 | 6/2000 |
| JP | P2009-114869 A | 5/2009 |

OTHER PUBLICATIONS

Japanese Office Action dated Sep. 18, 2012, issued in corresponding Japanese Application No. 2010-235950, with English translation.
Korean Office Action dated Nov. 21, 2012, issued in corresponding Korean Application No. 10-2011-106943, with English translation.
Office Action (5 pages) dated Feb. 7, 2014, issued in corresponding Chinese Application No. 201110330674.4 and English translation (4 pages).

* cited by examiner

*Primary Examiner* — Eric S McCall
(74) *Attorney, Agent, or Firm* — Nixon & Vanderhye PC

(57) ABSTRACT

When a deterioration determination apparatus determines a degree of deterioration in characteristics of an airflow meter, a driving condition of an engine is maintained at a specified condition in which intake air flow rate is greater than a specified value. A measurement error of the airflow meter is computed based on an intake air flow rate measured with the airflow meter. The degree of deterioration due to stain is determined based on the measurement error.

17 Claims, 5 Drawing Sheets

US 8,739,614 B2

DETERIORATION DETERMINATION APPARATUS FOR AIRFLOW METER AND DETERIORATION DETERMINATION METHOD

CROSS-REFERENCE TO RELATED APPLICATION

This application is based on Japanese Patent Application No. 2010-235950 filed on Oct. 20, 2010, the disclosure of which is incorporated herein by reference.

FIELD OF THE INVENTION

The present invention relates to a deterioration determination apparatus for a thermal airflow meter and a deterioration determination method. Especially, a deterioration in characteristics of a thermal airflow meter due to stain is determined.

BACKGROUND OF THE INVENTION

A thermal airflow meter, which measures an intake air flow rate to an engine, has a problem in which characteristics of the thermal airflow meter is deteriorated due to stain, such as dust, contamination, oil deposits, and the like. The thermal airflow meter will be referred to as AFM, hereinafter.

JP-4-174325A shows an AFM provided with a stain remover which removes a stain every when a vehicle travels a specified distance. However, in this AFM, deterioration in characteristics of the AFM is not diagnosed. Thus, even though the AFM is stained and its characteristics are deteriorated, it is likely that the stain is not removed. That is, it is desirable that a degree of deterioration due to stain should be determined.

Japanese Patent No. 3075877 shows a malfunction determination apparatus for an AFM. This malfunction determination apparatus has a determination means for determining whether an AFM has a malfunction according to an output level therefrom, a voltage variation obtaining function which obtains a variation in voltage applied to the AFM from a battery. After a voltage variation is obtained, the determination means starts to determine whether the AFM has a malfunction when a predetermined condition is established. In this malfunction apparatus, it is likely that the apparatus erroneously determines that the AFM has a malfunction, due to a variation in air flow rate.

JP-2000-97101A shows that a measurement error of an AFM is corrected in view of a variation in air flow rate due to pulsations when it is determined whether the AFM has a malfunction based on the measurement error. The variation in air flow rate is caused by a variation in engine speed, engine torque and driving conditions of the other relating components, such as an EGR valve, a throttle valve, a turbocharger and a variable valve timing mechanism. However, in JP-2000-97101A, such a driving condition of the other component is not considered. In order to correctly obtain the measurement error of the AFM, it is necessary to make the air flow rate more stable.

SUMMARY OF THE INVENTION

The present invention is made in view of the above matters, and it is an object of the present invention to provide a deterioration determination apparatus for a thermal airflow meter which is able to correctly determine deterioration in characteristics of a thermal airflow meter due to stain.

According to the present invention, a deterioration determination apparatus determines a degree of deterioration in characteristics of the thermal airflow meter when maintenance of a vehicle is conducted. The apparatus includes: a control means for controlling the engine in such a manner that a driving condition of the engine is brought into a specified condition; and a determining means for determining a degree of deterioration in characteristics of the thermal airflow meter by comparing a measurement error of the airflow meter with a specified determination value. The measurement error is detected when the engine is at the specified condition.

It is well known that the characteristics of an airflow meter deteriorate due to stain. That is, a measurement error of the airflow meter becomes large. The measurement error includes an error due to stain and an error due to other factors. The error due to other factors includes errors due to an individual variation of an airflow meter, an initial individual variation of the relating components, and aging deterioration of relating components and the airflow meter.

The relating components include an intake duct, a turbocharger, a throttle valve, an EGR valve and the like, which affect variation in intake air flow rate.

It should be noted that the measurement error due to stain of an airflow meter is not always distinguished from other measurement error due to other factors. When an engine is at a specified condition, these measurement errors can be distinguished from each other.

According to the present invention, a driving condition of an engine is brought into the specified condition, and then a measurement error of an airflow meter is detected, whereby it can be determined whether a measurement error due to stain exists and a degree of deterioration in characteristics due to stain can be determined. Further, while the intake air flow rate is stable, the measurement error of an airflow meter is detected, so that a deterioration determination can be conducted with high accuracy.

BRIEF DESCRIPTION OF THE DRAWINGS

Other objects, features and advantages of the present invention will become more apparent from the following description made with reference to the accompanying drawings, in which like parts are designated by like reference numbers and in which.

DETAILED DESCRIPTION OF EMBODIMENTS

[Configuration of First Embodiment]

Figure 1:
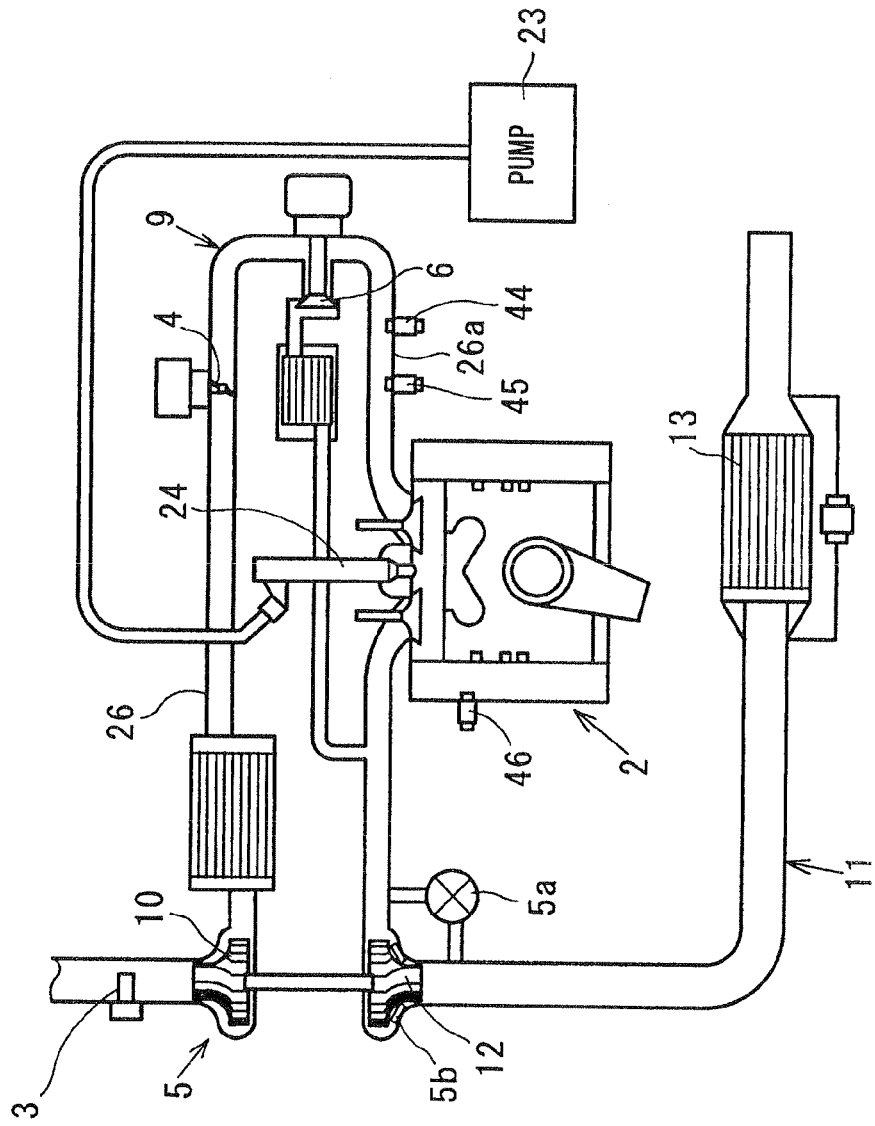
FIG. 1 is a schematic view showing an internal combustion engine (diesel engine) having an airflow meter according to a first embodiment.
Figure 2:
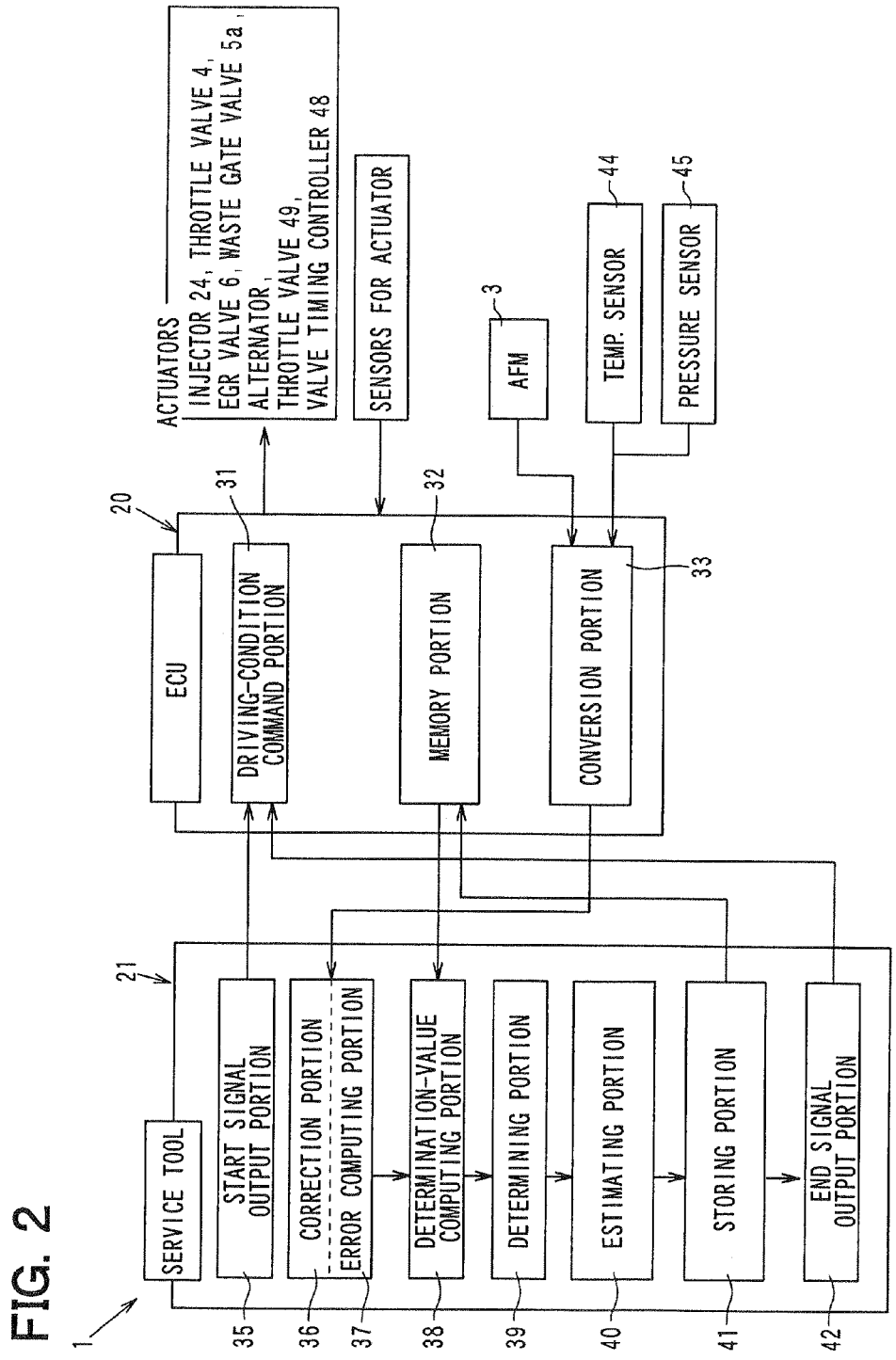
FIG. 2 is a block diagram showing a configuration of a deterioration determination apparatus according to the first embodiment, a second embodiment and a fourth embodiment.
Figure 3:
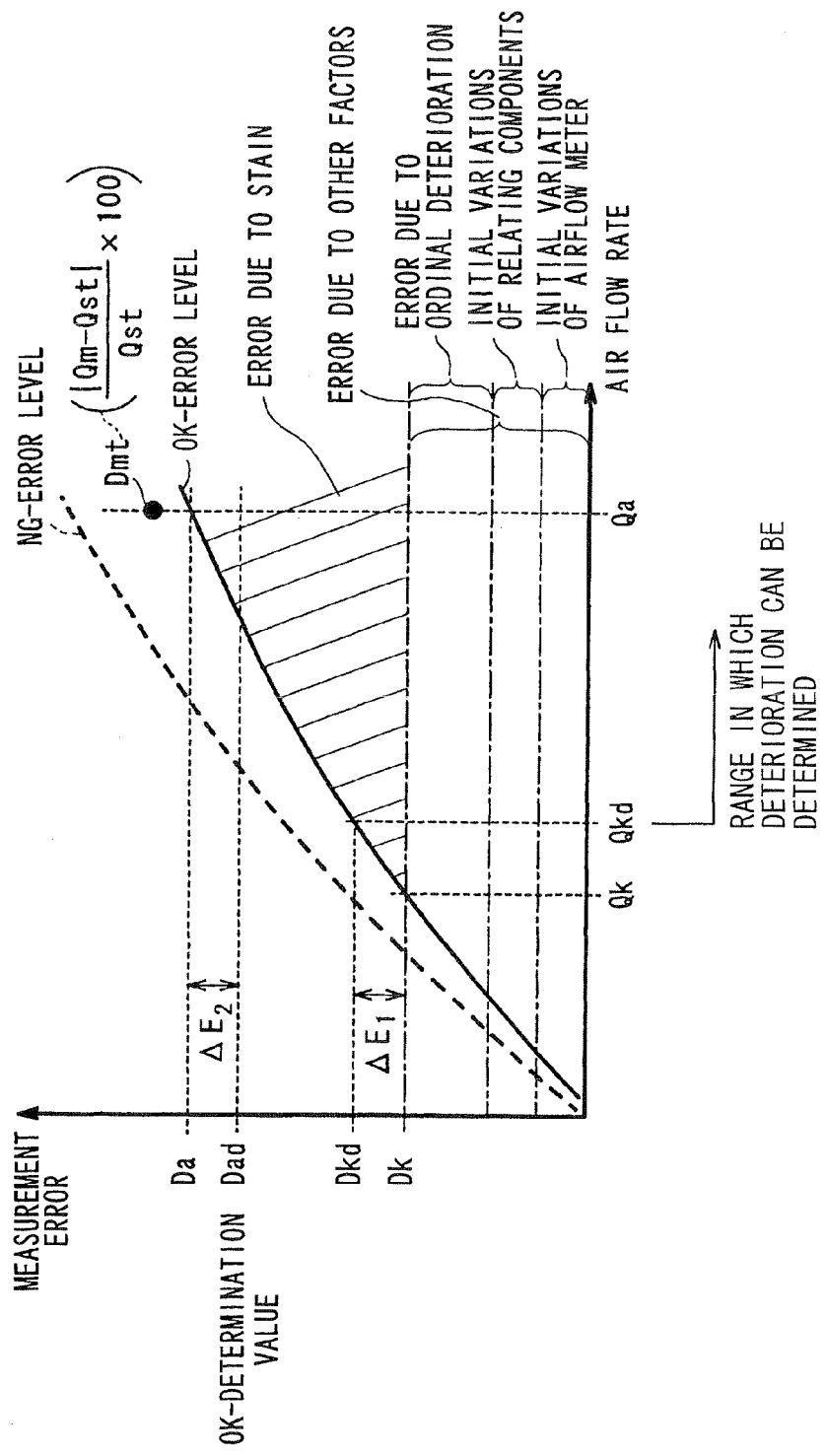
FIG. 3 is a graph showing a relationship between an intake air flow rate and a measurement error according to the first embodiment.

Referring to FIGS. 1 to 3, a configuration of a deterioration determination apparatus 1 for an airflow meter (AFM) will be described. The deterioration determination apparatus 1 determines a degree of deterioration in characteristics of an AFM 3 when a vehicle is maintained. The AFM 3 measures intake air flow rate of an internal combustion engine 2. In the present embodiment, the internal combustion engine 2 is a diesel engine. A throttle valve 4, a turbocharger 5 and an EGR valve 6 are provided in a diesel engine control system.

In an intake passage 9, the AFM 3, a compressor 10 of the turbocharger 5, the throttle valve 4 and the EGR valve 6 are arranged in this order. In an exhaust passage 11, a turbine 12 of the turbocharger 5 and a catalyst 13 are arranged. The AFM 3 is a well known sensor which has a detection portion for detecting an intake air flow rate, and an electric circuit which controls an input and an output of the detection portion.

The deterioration determination apparatus 1 includes an electronic control unit (ECU) 20 and an external connection equipment (service tool 21) which will be connected to the ECU 20 when the vehicle is maintained. The ECU 20 is comprised of a CPU, a ROM, and a RAM. According to control programs stored in the memories and outputs of various sensors, the ECU 20 controls various actuators.

Further, the ECU 20 controls a fuel pump 23, a fuel injector 24, the throttle valve 4, the EGR valve 6 and the turbocharger 5. The service tool 21 is mainly comprised of a microcomputer. The service tool 21 can perform an interactive communication with the ECU 20.

When the deterioration determination apparatus 1 determines the deterioration in characteristics of the AFM 3, a driving condition of the engine 2 is brought into a specific condition in which an intake air flow rate is a predetermined value. The deterioration determination apparatus 1 determines the deterioration due to stain by comparing a measurement error of the AFM 3 in the specific condition with a specified determination value.

It should be noted that the above predetermined value of the intake air flow rate is a value based on which a measurement error due to stain and a measurement error due to other factors can be distinguished from each other.

The other factor causing the measurement error includes an initial individual variation of the AFM 3, an initial individual variation of the relating components, and aging deterioration of the relating components and the AFM 3. The relating components includes an intake duct 26 (intake manifold 26a), the turbocharger 5, the throttle valve 4, the EGR valve 6.

In a case that the AFM 3 is a bobbin-type AFM, the measurement error due to stain of the AFM 3 is increased in a high air flow rate region. That is, when the air flow rate is low, the measurement error of the AFM 3 due to stain is small. The measurement error due to stain is hardly distinguished from the measurement errors due to other factors. When the air flow rate is high, the measurement error of the AFM 3 due to stain is large. Thus, this measurement error can be distinguished from others.

FIG. 3 shows an allowable level of measurement error relative to air flow rate according to emission control standard, which is shown by a dashed line and is referred to as NG-error level. Further, FIG. 3 shows another allowable level of measurement error for determination, which is defined more strictly than the NG-error level as shown by a solid line and is referred to as OK-error level.

In present embodiment, the measurement error is defined based on a reference air flow rate "Qst" at a specified engine driving condition and a measured air flow rate "Qm" by the AFM 3 at the specified engine driving condition. Specifically, the measurement error "Mer" is defined as follows:

$$Mer = |Qm - Qst|/Qst \times 100$$

In a case that the AFM 3 is a bobbin-type AFM, the valued of "Qm−Qst" is a negative value.

As the air flow rate becomes higher, the measurement error becomes larger. Also, as the air flow rate becomes higher, the NG-error level and the OK-error level become higher.

In a case that the measurement error is determined based on the OK-error level, even though a measurement error due to stain exists, this measurement error due to stain can not be distinguished from other measurement errors.

It has been experimentally known that a measurement error larger than a specified value "Dk" is a measurement error due to stain. Thus, in a case that a measurement error is determined based on the OK-error level, unless the air flow rate is higher than a specified air flow rate "Qk" at which a measurement error larger than "Dk" arises, the measurement error due to stain can not be distinguished from others. In other words, according to a measurement error arising when the air flow rate is higher than "Qk", a degree of a measurement error due to stain can be obtained, whereby a degree of deterioration due to stain can be determined.

In an actual maintenance, in view of a variation in air flow rate, another reference air flow rated "Qkd" greater than "Qk" is defined. In a range greater than "Qkd", the degree of the measurement error due to stain is determined.

When the air flow rate is "Qkd", the measurement error "Dkd" appears on an OK-error level curve line. The measurement error "Dkd" is a measurement error in which a variation in measurement error $\Delta E_1$ is added to "Dk".

While the air flow rate is maintained higher than "Qkd", for example "Qa", a deterioration determination is started.

[Deterioration Determination]

The configuration of the AFM deterioration determination apparatus 1 and a method of deterioration determination will be described in detail, hereinafter.

The ECU 20 functions as a fuel injection quantity control means, a throttle control means, an EGR valve control means, a turbocharger control means, and a memory means. Specifically, the ECU 20 has a driving-condition command portion 31, a memory portion 32 which stores previous maintenance time and previous measurement error, and a conversion portion 33 which converts a sensor output into a physical quantity.

The service tool 21 functions as a determination means, a determination value computing means, a computing means which computes next maintenance time, and a correction means. Specifically, the service tool 21 includes a determination-start signal output portion 35, a correction portion 36 which corrects air flow rate, an error computing portion 37 which computes a measurement error, a determination-value computing portion 38, a determining portion 39, an estimating portion 40 which estimates next maintenance time, a storing portion 41 which indicates and stores a determination results and next maintenance time, and a determination-end signal output portion 42.

When an operator connects the service tool 21 to the ECU 20 and inputs a determination-start signal into the determination-start signal output portion 35, the portion 35 outputs a determination-start signal to the ECU 20.

The driving-condition command portion 31 outputs control signals to controllers of actuators (fuel injector 24, throttle valve 4, EGR valve 6, and waste gate valve 5a). That is, based on outputs of actuator condition detecting sensors, the actuators are controlled.

The ECU 20 receives the determination-start signal to the service tool 21 and controls the fuel injector 24 so that a specified engine speed is obtained. For example, the fuel injection quantity is controlled to obtain the specified engine speed.

The throttle valve 4 is controlled to be positioned at a specified position or a full-opened position. The EGR valve 6 is fixed at a specified position or at a full-closed position. The waste gate valve 5a of the turbocharger 5 is also controlled to be positioned at a specified position. When the EGR valve 6 is fully closed, the waste gate valve 5a is opened, so that an excessive rotation of the turbocharger 5 is restricted.

When the actuators are brought into the specified driving condition, a sensor output of the AFM 3 is converted into physical quantity (air flow rate) by the conversion portion 33. The measured air flow rate by the AFM 3 is transmitted to the service tool 21. Also, the sensor output of the intake air temperature sensor 44 and the intake air pressure sensor 45 are respectively converted into temperature and pressure by the conversion portion 33. The temperature and the pressure are transmitted into the service tool 21.

The correction portion 36 corrects the air flow rate measured with the AFM 3 according to the temperature and the pressure of air. That is, based on the air temperature and the air pressure which the intake air temperature sensor 44 and the intake air pressure sensor 45 measure, the air flow rate measure by the AFM 3 is converted into an air flow rate of a reference temperature and a reference pressure. This corrected air flow rate is defined as a measured air flow rate "Qm" of the AFM 3 which is used in the present maintenance.

The error computing portion 37 computes a measurement error "Dmt" based on a reference air flow rate "Qst" and the measured air flow rate "Qm". The reference air flow rate "Qst" is defined when the engine speed is a specified speed. The reference air flow rate "Qst" is previously stored in the service tool 21. It should be noted that the actual air flow rate is not always the reference air flow rate "Qst" even when the engine speed is the specified speed, due to a variation in an intake manifold pressure. In FIG. 3, the actual air flow rate is denoted by "Qa".

The memory portion 32 stores a previous maintenance time "Tb" and a previous measurement error "Dmb" of the AFM 3 at the previous maintenance. These previous maintenance time "Tb" and the previous measurement error "Dmb" are inputted into the service tool 21. The determination-value computing portion 38 computes a specified determination value (OK-determination value) which is used for present determination, based on the previous maintenance time "Tb", the previous measurement error "Dmb", the present maintenance time "Tt" and the present measurement error "Dmt".

The determination-value computing portion 38 computes a deterioration speed "SPD" based on "Tb", "Dmb", "Tt", and "Dmt", and estimates a measurement error which is estimated to be increased by the next maintenance time based on the deterioration speed. This estimated measurement error is referred to as an estimated increased error. The deterioration speed "SPD" can be expressed by the following formula.

$$SPD = (Dmt - Dmb)/(Tt - Tb)$$

Then, the OK-error level (solid line in FIG. 3) is defined based on the previously stored NG-error level (dashed line in FIG. 3) and the estimated increased error. This OK-error level is an admissible error level for determination. Based on this level, it is determined whether the AFM 3 should be replaced to new one.

When the air flow rate is "Qa", the OK-error level is "Da". The present measurement error "Dmt" should be compared with "Da". However, the air flow rate "Qa" varies due to a variation in engine speed. Thus, in the present embodiment, the value of "Dad" smaller than the value of "Da" is defined as the OK-determination value.

In view of the variation in air flow rate, the value of "Dad" is set smaller than the value of "Da" by $\Delta E_2$.

Then, the determining portion 39 determines a degree of deterioration in characteristics due to stain by comparing the present measurement error "Dmt" with the OK-determination value "Dad". For example, when the present measurement error "Dmt" is greater than the OK-determination value, it is determined that the AFM 3 is stained and some treatments are necessary. That is, the AFM 3 is required to be cleaned or replaced by new one.

The estimating portion 40 computes next maintenance time based on the deterioration speed. The storing portion 41 indicates the determination result of the determining portion 39 and the next maintenance time on a display of the service tool 21. The memory portion 32 stores the present maintenance time "Tt", the present measurement error "Dmt", the previous maintenance time "Tb", the previous measurement error "Dmb".

When an operator inputs a determination-end to the service tool 21, the determination-end signal output portion 42 outputs a determination-end signal to the ECU 20. Then, the driving-condition command portion 31 controls the various actuators to be stopped.

[Advantages of First Embodiment]

When the deterioration determination apparatus 1 determines the degree of the deterioration in characteristics of the AFM 3, a driving condition of the engine 2 is brought into a specific condition in which an intake air flow rate is a predetermined value. The deterioration determination apparatus 1 determines the deterioration due to stain by comparing a measurement error of the AFM 3 in the specific condition with a specified threshold.

That is, while the driving condition of the engine 2 is kept at a specified condition in which the air flow rate "Qa" is obtained, the measurement error "Dmt" is computed based on the air flow rate measured with the AFM 3. Based on this measurement error "Dmt", a degree of deterioration in characteristics is determined. The degree of the measurement error due to stain can be determined and a degree of deterioration in characteristics due to stain can be determined.

In the first embodiment, the AFM 3 is provided to a diesel engine which is equipped with the EGR valve 6 and the turbocharger 5.

When the degree of deterioration is determined, the position of the EGR valve 6 and the position of the waste gate valve 5a are fixed. Thus, the measurement error "Dmt" of the AFM 3 can be detected correctly under a condition where the air flow rate is stable. The deterioration determination can be executed with high accuracy.

In a case that a variable nozzle vane 5b is provided around the turbine 12, the angle of the variable nozzle vane 5b is fixed at a specified value when the deterioration determination is executed.

According to the first embodiment, the deterioration speed "SPD" is computed based on the previous maintenance time "Tb", the previous measurement error "Dmb", the present maintenance time "Tt", and the present measurement error "Dmt". Based on the deterioration speed "SPD", the determination value for present maintenance is computed.

Thus, in view of an individual variation in vehicle, the determination value can be defined for each vehicle. For example, in a case of a vehicle where the AFM 3 is deteriorated early, the determination value is made stricter.

Further, a next maintenance time is computed based on the deterioration speed "SPD". Thus, in view of an individual variation in vehicle, the next maintenance time can be defined. For example, in a case that the AFM 3 is deteriorated early, the next maintenance time is made earlier.

Further, based on the air temperature and the air pressure measured with the sensors 44, 45, the air flow rate measured with the AFM 3 is converted into an air flow rate of under the reference pressure. Then, based on the converted air flow rate, the measurement error "Dmt" is computed.

Therefore, even if atmospheric pressure is low and air temperature is high or low, the deterioration determination can be conducted accurately based on the measurement error "Dmt".

Further, since the air temperature and the air pressure are measured with the intake air temperature sensor 44 and the intake air pressure sensor 45 provided to the intake manifold 26a, any other sensor is unnecessary for correcting the measured air flow rate.

[Configuration of Second Embodiment]

Referring to FIG. 2, a second embodiment will be described.

According to the second embodiment, when a deterioration determination is conducted, an operation condition of an alternator is brought into a specified condition. The driving-condition command portion 31 has a function of electric load control. When the portion 31 receives the determination-start signal, the driving-condition command portion 31 controls components driven by the engine to the specified conditions, whereby the operation condition of the alternator is maintained at the specified condition.

Thus, while the air flow rate is stable, the AFM 3 can detect the measurement error and conduct the deterioration determination with high accuracy.

[Configuration of Third Embodiment]

According to a third embodiment, a deterioration determination apparatus 1 further includes a start-determining portion which determines whether the engine 2 is at warming-up condition and which outputs a determination start command to the driving-condition command portion 31 when the engine 2 is warming up condition.

Based on a variation in intake air temperature or a variation in engine room temperature which is measured with the coolant temperature sensor 46 or the intake air temperature sensor 44, it is determined whether the engine is at warming-up condition.

If the engine room temperature or the intake air temperature is unstable, the intake air flow rate fluctuates. By starting the determination after the engine is brought into the warming-up condition, the AFM 3 can detects the measurement error under a condition where the intake air flow rate is stable, whereby the deterioration determination can be conducted with high accuracy.

[Configuration of Fourth Embodiment]

Figure 4:
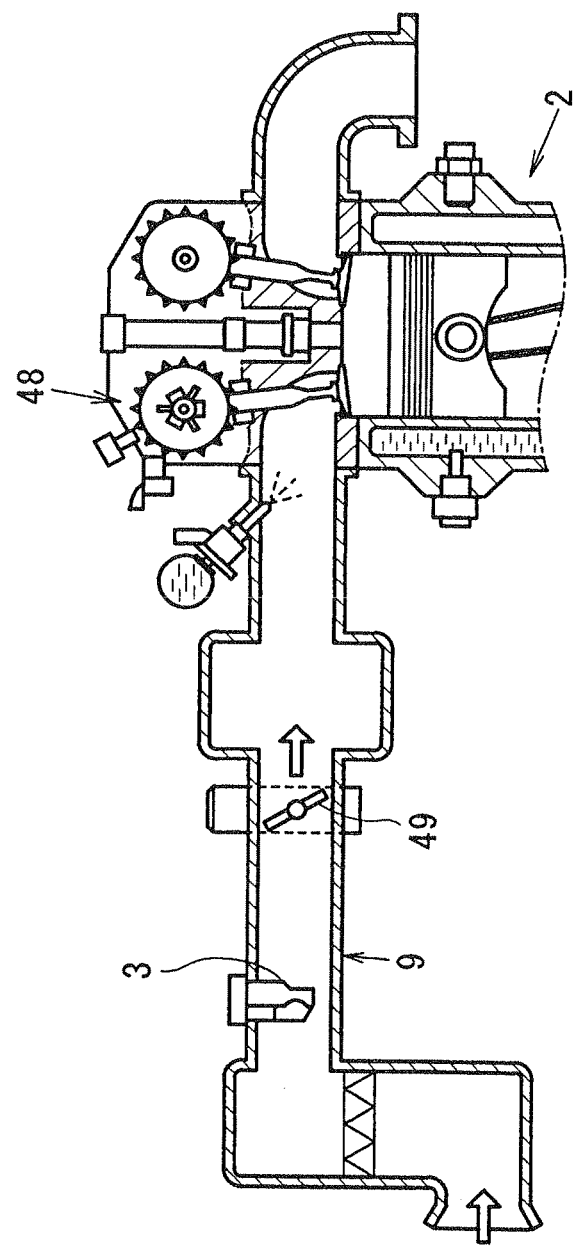
FIG. 4 is a schematic view showing an internal combustion engine (diesel engine) having an airflow meter according to the fourth embodiment.

Referring to FIG. 4, a fourth embodiment will be described.

According to the fourth embodiment, the deterioration determination apparatus 1 determines the deterioration of the AFM 3 that is mounted on a gasoline engine 2. The gasoline engine 2 is provided with a variable valve timing controller 48 which adjusts a valve timing of an intake valve. The AFM 3 is provided upstream of a throttle valve 49 in an intake air passage 9.

The ECU 20 receives the determination-start signal from the service tool 21 and controls the throttle valve 49 so that a specified engine speed is obtained. The variable valve timing controller 48 advances the valve timing of the intake valve.

The measurement error of the AFM 3 can be detected while the air flow rate is stable. The deterioration determination can be conducted with high accuracy. In a case that the variable valve timing controller adjusts a valve timing of an exhaust valve, the valve timing of the exhaust valve is also advanced by a specified amount. In a case that the engine 2 is provided with a variable valve lift controller, the valve lift amount is fixed at a specified value while the deterioration determination is conducted.

[Configuration of Fifth Embodiment]

Figure 5:
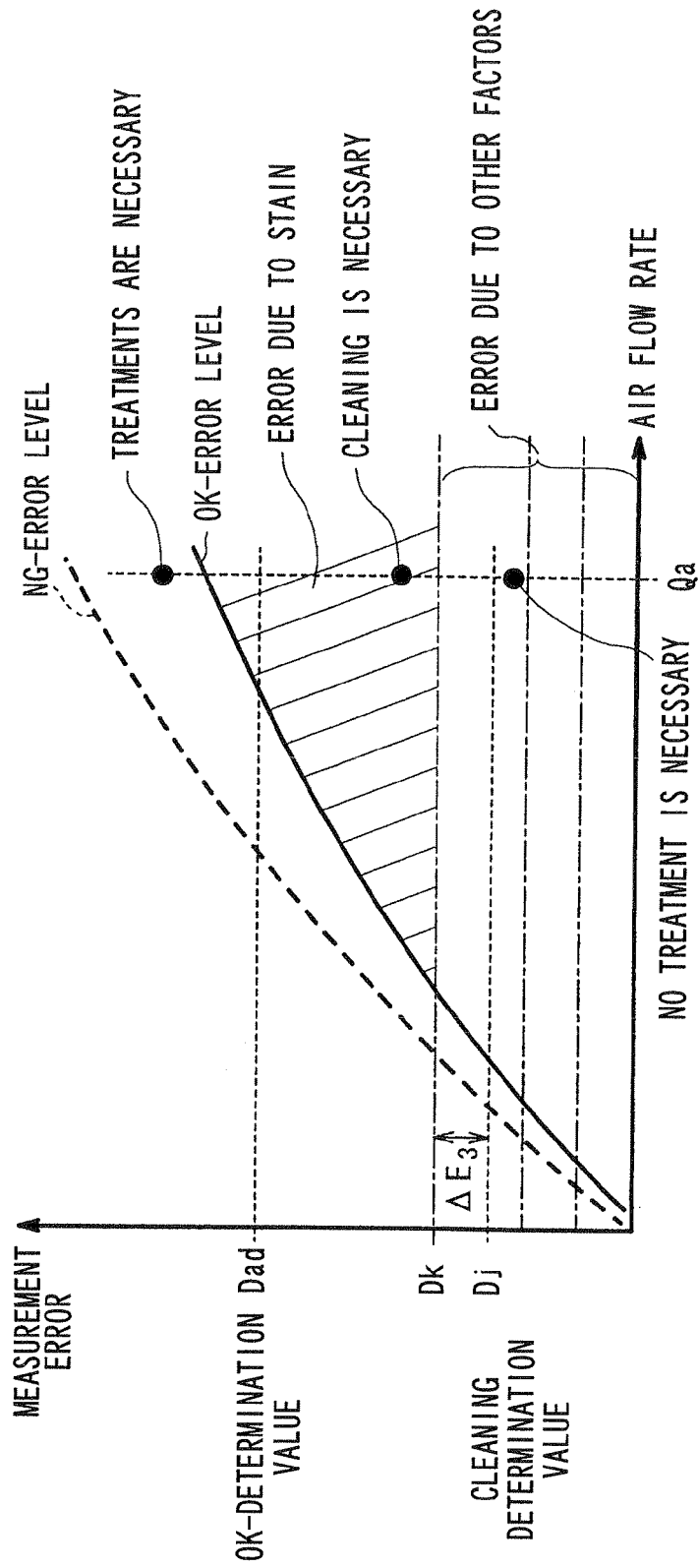
FIG. 5 is a graph for explaining a cleaning determination value according to a fifth embodiment.

Referring to FIG. 5, a fifth embodiment will be described.

According to the fifth embodiment, a cleaning determination value is defined in addition to the OK-determination value. By comparing the measurement error "Dmt" with the determination values, a degree of deterioration in characteristics due to stain is determined.

The cleaning determination value is set smaller than the OK-determination value. When the measurement error "Dmt" is greater than the OK-determination value, it is determined that some treatments are necessary. When the measurement error "Dmt" is greater than the cleaning determination value and smaller than the OK-determination value, it is determined that cleaning of the AFM 3 is necessary. When the measurement error "Dmt" is smaller than the cleaning determination value, it is determined no treatment is necessary.

The cleaning determination value is defined based on another measurement error "Dk" which is estimated to be caused by factor other than stain. When the measurement error is larger than the error "Dk", it is considered that the measurement error is caused by stain of the AFM 3. It should be noted that the cleaning determination value is smaller than the measurement error "Dk", and is denoted by "Dj". The cleaning determination value "Dj" is defined in view of a variation $\Delta E_3$ in measurement error on the OK-error level curve.

[Modification]

The driving condition of the engine 2 can be brought into the specified condition by controlling the accelerator position, a throttle position, fuel injection quantity, or intake manifold pressure.

The correction portion 36, the determination-value computing portion 38, the determining portion 39, and the estimating portion 40 may be provided to the ECU 20.

When the deterioration determination is conducted, the driving condition of the engine 2 may be kept at the specified condition by keeping the accelerator pedal at a specified position.

The present invention can be applied to a thin-film type AFM.

What is claimed is:

1. A deterioration determination apparatus for a thermal airflow meter measuring an intake air flow rate of an internal combustion engine, the deterioration determination apparatus determining a degree of deterioration in characteristics of the thermal airflow meter when a maintenance of a vehicle is conducted, comprising:
   a control means for controlling the engine in such a manner that a driving condition of the engine is brought into a specified condition, including the control means adjusting an intake air flow rate of the engine so that the driving condition of the engine is brought into a specified air flow rate and adjusting a speed of the engine so that the driving condition of the engine is brought into a specified engine speed; and
   a determining means for determining a degree of deterioration in characteristics of the thermal airflow meter by comparing a measurement error of the airflow meter with a specified determination value, wherein the measurement error is detected when the engine is at the specified condition.

2. A deterioration determination apparatus according to claim 1, wherein
the control means adjusts an accelerator position, a throttle position, a fuel injection quantity or an intake manifold pressure so that the driving condition of the engine is brought into the specified condition.

3. A deterioration determination apparatus according to claim 1, wherein
the internal combustion engine is a gasoline engine, and
the control means adjusts a throttle position so that the speed of the engine is brought into the specified engine speed.

4. A deterioration determination apparatus according to claim 1, wherein
the internal combustion engine is a diesel engine, and
the control means adjusts a fuel injection quantity so that the speed of the engine is brought into the specified engine speed.

5. A deterioration determination apparatus according to claim 4, wherein
the internal combustion engine is provided with a throttle valve, and
a position of the throttle valve is set at a specified valve position or a full-open position when the determining means determines the degree of deterioration.

6. A deterioration determination apparatus according to claim 1, wherein
the internal combustion engine is provided with an EGR valve, and
a position of the EGR valve is set at a specified EGR valve position or a full-close EGR position when the determining means determines the degree of deterioration.

7. A deterioration determination apparatus according to claim 1, wherein
the internal combustion engine is provided with a turbocharger and a waste gate valve or a variable nozzle vane, and
a position of the waste gate valve is set at a specified gate valve position or a condition of the variable nozzle vane is set at a specified vane condition when the determining means determines the degree of deterioration.

8. A deterioration determination apparatus according to claim 1, wherein
the control means adjust an operation condition of an alternator to a specified operation condition when the determining means determines the degree of deterioration.

9. A deterioration determination apparatus according to claim 1, further comprising
a start-determining means for determining whether the internal combustion engine is at warming-up condition and for outputting a determination start command when the engine is at warming up condition.

10. A deterioration determination apparatus according to claim 1, wherein
the control means and the determining means are comprised of at least one of an electric control unit mounted on a vehicle and a service tool which is able to be connected to the electric control unit.

11. A deterioration determination apparatus for a thermal airflow meter measuring an intake air flow rate of an internal combustion engine, the deterioration determination apparatus determining a degree of deterioration in characteristics of the thermal airflow meter when a maintenance of a vehicle is conducted, comprising:
a control means for controlling the engine in such a manner that a driving condition of the engine is brought into a specified condition; and
a determining means for determining a degree of deterioration in characteristics of the thermal airflow meter by comparing a measurement error of the airflow meter with a specified determination value, wherein the measurement error is detected when the engine is at the specified condition; wherein:
the control means adjusts an intake air flow rate of the engine so that the driving condition of the engine is brought into the specified condition;
the internal combustion engine is provided with at least one of a variable valve timing controller and
a variable valve lift controller, and the variable valve timing controller sets an advance quantity of a valve timing at a specified advance value, and the variable valve lift controller sets a valve lift at a specified lift value when the determining means determines the degree of deterioration.

12. A deterioration determination apparatus for a thermal airflow meter measuring an intake air flow rate of an internal combustion engine, the deterioration determination apparatus determining a degree of deterioration in characteristics of the thermal airflow meter when a maintenance of a vehicle is conducted, comprising:
a control means for controlling the engine in such a manner that a driving condition of the engine is brought into a specified condition; and
a determining means for determining a degree of deterioration in characteristics of the thermal airflow meter by comparing a measurement error of the airflow meter with a specified determination value, wherein the measurement error is detected when the engine is at the specified condition; wherein:
the control means adjusts an intake air flow rate of the engine so that the driving condition of the engine is brought into the specified condition:
the deterioration determination apparatus further comprises:
a memory means for storing a previous maintenance time and a previous measurement error of the airflow meter; and
a determination-value computing means for computing the specified determination value based on a present maintenance time, a present measurement error, the previous maintenance time and the previous measurement error.

13. A deterioration determination apparatus according to claim 12, further comprising
an estimating means for estimating a next maintenance time based on the present maintenance time, the present measurement error, the previous maintenance time and the previous measurement error.

14. A deterioration determination apparatus for a thermal airflow meter measuring an intake air flow rate of an internal combustion engine, the deterioration determination apparatus determining a degree of deterioration in characteristics of the thermal airflow meter when a maintenance of a vehicle is conducted, comprising:
a control means for controlling the engine in such a manner that a driving condition of the engine is brought into a specified condition; and
a determining means for determining a degree of deterioration in characteristics of the thermal airflow meter by comparing a measurement error of the airflow meter with a specified determination value, wherein the measurement error is detected when the engine is at the specified condition: wherein:

the control means adjusts an intake air flow rate of the engine so that the driving condition of the engine is brought into the specified condition;

the deterioration apparatus further comprises:

a correction means for correcting the measurement error of the airflow meter based on an air temperature and an air pressure, wherein the measurement error of the airflow meter is computed based on the corrected measurement error.

15. A deterioration determination apparatus according to claim 14, wherein the air temperature and the air pressure are measured in an intake manifold.

16. A deterioration determination method for determining a degree of deterioration in a thermal airflow meter based on a measurement error of the thermal airflow meter that measures an intake air flow rate of an internal combustion engine, wherein an accelerator position is kept at a specified position, and the degree of deterioration in characteristics of the thermal airflow meter is determined based on the measurement error of the thermal airflow meter while the accelerator position is kept at the specified position.

17. The method as in claim 16, wherein:

the intake air flow rate of the engine is adjusted so that a driving condition of the engine is brought into a specified air flow rate;

a speed of the engine is adjusted so that the driving condition of the engine is brought into a specified engine speed; and the degree of deterioration in characteristics of the thermal airflow meter is determined based on the measurement error of the thermal airflow meter while the accelerator position is kept at the specified position and when the intake air flow rate is at the specified air flow rate and the speed of the engine is at the specified engine speed.

* * * * *